ated Aug. 28, 1973

3,755,468
1 - CHLORO - 1,1,3,3,3 - PENTAFLUORO-2-PROPYL METHYL ETHER AS INHALATION ANESTHETIC

Everett E. Gilbert and Benjamin Veldhuis, Morristown, N.J., assignors to Allied Chemical Corporation, New York, N.Y.
No Drawing. Original application Jan. 10, 1967, Ser. No. 608,276, now Patent No. 3,594,484. Divided and this application Apr. 5, 1971, Ser. No. 131,473
Int. Cl. C07c 43/00
U.S. Cl. 260—614 F
1 Claim

ABSTRACT OF THE DISCLOSURE

This application relates to the novel compound 1-chloro-1,1,3,3,3-pentafluoro-2-propyl methyl ether and its use as a potent general inhalation anesthetic having a high margin of toxic safety.

---

This application is a divisional of U.S. application Ser. No. 608,276, filed Jan. 10, 1967, now U.S. Pat. No. 3,594,484.

In the field of general anesthesia the discovery of compounds possessing anesthetic properties which have higher potency and greater safety margins than the commonly used anesthetics is greatly to be desired for obvious reasons.

We have now found that the novel compound 1-chloro-1,1,3,3,3-pentafluoro-2-propyl methyl ether, has high potency and a high safety margin as a general inhalation anesthetic when administered to inhalation-anesthetic-susceptible organisms. It can be prepared by first preparing 1-chloro-1,1,3,3,3-pentafluoropropan-2-ol and then reacting that compound with dimethyl sulfate, in the manner of the following example:

EXAMPLE

Seventy-six grams of sodium borohydride was added to 669 grams of diethylene glycol dimethyl ether in a flask with stirring, followed by introduction of 1130 grams of gaseous pentafluoromonochloroacetone. The above additions were carried out with such external cooling as to maintain the temperature of the resulting reaction mixture at 40° C. The reaction mixture was then added to a mixture of 700 grams of ice water and 175 ml. of concentrated HCl. About 1200 grams of aqueous 1-chloro-1,1,3,3,3-pentafluoropropan-2-ol separated as an oil layer. Additional 1-chloro-1,1,3,3,3-pentafluoropropan-2-ol was recovered from the remaining aqueous acid solution by refluxing and collecting the heavy aqueous-alcoholic layer in a Dean-Stark apparatus. The aqueous alcohol layers were combined, dried over MgSO$_4$ and distilled, collecting the cut between 82–105° C. This fraction was mixed with an equal volume of 85% H$_2$SO$_4$ and redistilled in the presence of the acid layer. 796 grams of 1-chloro-1,1,3,3,3-pentafluoropropan-2-ol which boiled at 82° C., was recovered. Analysis of the recovered compound by nuclear magnetic resonance resulted in observed values of 50.3% fluorine and 1.0% hydrogen by weight, as compared with calculated values of 51.4% and 1.1%, respectively.

Ninety-two grams of 1-chloro-1,1,3,3,3-pentafluoropropan-2-ol and 180 grams of water were mixed and 40 grams of 50% by weight aqueous sodium hydroxide solution was then added to the mixture with cooling. Sixty-three grams of dimethyl sulfate was then added dropwise to the mixture with agitation at 10° C. over about an hour. The mixture was warmed at room temperature for about an hour, and then at 60° C. for 1.5 hours, during which time an oily layer separated. This oily layer was separated, water-washed, dried over sodium sulfate, yielding 82 grams. Distillation of this material gave 73.1 grams of 1-chloro-1,1,3,3,3-pentafluoro-2-propyl methyl ether, which boiled at 78–80° C. Infrared spectroscopy yielded the expected spectrum.

The physiological effects of 1-chloro-1,1,3,3,3-pentafluoro-2-propyl methyl ether were demonstrated in the following manner, using a standard test for evaluation of inhalation anesthetics similar to that described by Robbins, J. Pharmacology and Experimental Therapeutics, 86, 197–204 (1946).

In the test as carried out, five mice were placed in each of a number of 6.3 liter animal jars wherein the mice were subjected to various dose levels of inhalation anesthetic vapor. Ten mice (five in each of two jars) were used for each dose level. A minimum of three graded doses, injected at 0.1 ml. for 10 seconds was used to establish the dose which caused 50% of the mice to lose the righting reflex in five minutes. The concentration of anesthetic vapor in the jar was calculated using the ideal gas law (see Carson et al., Anesthesiology, 23, 187 (1962)). The "AD$_{50}$" (volume percent of compound required to anesthetize 50% of the mice used), was determined by plotting the data on log-probit graph paper (see Miller et al., Proc. Soc. Exp. Biol. and Med., 57, 261 (1944)). Essentially the same experimental procedure was used to determine the "LD$_{50}$" (dosage required to kill 50% of the mice).

The AD$_{50}$ obtained upon testing the 1-chloro-1,1,3,3,3-pentafluoro-2-propyl methyl ether was 0.895, and the LD$_{50}$ was 5.31. The "AI" (anesthetic index=LD$_{50}$÷AD$_{50}$) was therefore 5.93. The AI is a measure of the margin of toxic safety of the compound; the higher the number, the less toxic the compound relative to the dosage needed to induce anesthesia. Three of the most highly developed commercial fluorinated anesthetics, "Fluothane" (1,1,1-trifluoro-2-bromo-2-chloroethane), "Penthrane" (2,2-dichloro-1,1-difluoroethyl ether), and "Fluoromar" (trifluoroethyl vinyl ether) had AD$_{50}$ values 0.78, 0.51 and 3.5, respectively, and AI values in the range of 3.3 to 4.5. It is apparent therefore that 1-chloro-1,1,3,3,3-pentafluoro-2-propyl methyl ether is a potent anesthetic and possesses very low toxicity.

It is considered surprising that 1-chloro-1,1,3,3,3-pentafluoro-2-propyl methyl ether has such high potency and low toxicity since 1,1,1,3,3,3-hexafluoro-2-propyl methyl ether, a compound which differs from the subject compound only by the substitution of one fluorine atom for a chlorine atom, has an AD$_{50}$ value of 2.23 and an AI value of 4.4. It is thus apparent that the subject compound is about three times as potent as 1,1,1,3,3,3-hexafluoro-2-propyl methyl ether and has a significantly larger margin of toxic safety.

While the invention has been described with particular reference to specific embodiments, it is to be understood that it is not to be limited thereto but is to be construed broadly and restricted solely by the scope of the appended claims.

We claim:
1. 1-chloro-1,1,3,3,3-pentafluoro-2-propyl methyl ether.

References Cited
UNITED STATES PATENTS

| | | | |
|---|---|---|---|
| 3,291,844 | 12/1966 | Watson | 260—614 F |
| 3,476,860 | 11/1969 | Croix et al. | 260—614 F X |
| 3,346,448 | 10/1967 | Gilbert et al. | 260—614 F X |
| 3,352,928 | 11/1967 | Gilbert et al. | 260—614 F |

HOWARD T. MARS, Primary Examiner

U.S. Cl. X.R.
359—84